United States Patent [19]

White et al.

[11] Patent Number: 5,382,951
[45] Date of Patent: Jan. 17, 1995

[54] INITIALIZATION METHOD AND A SYSTEM FOR TRANSMITTING MESSAGES BETWEEN A CONTROL TERMINAL AND CONTROLLED TERMINALS

[75] Inventors: Trevor White, Dunwoody, Ga.; Tibor Somogyi, Verrieres le Buisson; Arnaud Fausse, Paris, both of France

[73] Assignee: Schlumberger Industries, S.A., Montrouge, France

[21] Appl. No.: 898,277

[22] Filed: Jun. 15, 1992

[30] Foreign Application Priority Data

Jun. 21, 1991 [FR] France ................................ 91 07684

[51] Int. Cl.⁶ .............................................. H04Q 1/00
[52] U.S. Cl. ............................ 340/825.52; 340/825.53
[58] Field of Search ................. 340/825.07, 825.08, 340/825.52, 825.53, 310 A, 310 R; 370/85.8, 92

[56] References Cited

U.S. PATENT DOCUMENTS 4,750,136  6/1988  Arpin et al. ............... 340/825.08

*Primary Examiner*—Donald J. Yusko
*Assistant Examiner*—Brian Zimmerman
*Attorney, Agent, or Firm*—Sanford J. Asman

[57] ABSTRACT

The invention relates to a method and a system for transmitting messages between a control terminal and controlled terminals for use especially in home automation installations. The controlled terminals are installed on a transmission network connected to the control terminal. The messages all have the same structure and include an originator field and a destination field. To install a new terminal a data item specific thereto is entered in the terminal. The new terminal installed transmits an installation request message including the specific data item to the terminal. In response the control terminal transmits an installation message which includes all the data needed for the installed terminal to converse with the control terminal.

6 Claims, 2 Drawing Sheets

INITIALIZATION METHOD AND A SYSTEM FOR TRANSMITTING MESSAGES BETWEEN A CONTROL TERMINAL AND CONTROLLED TERMINALS

The present invention concerns a message transmission method and system for transmitting messages between a control terminal and controlled terminals.

More particularly the invention concerns the transmission of messages, i.e. given data, between a control terminal and controlled terminals which are interconnected by a network allowing transfer of the messages.

BACKGROUND OF THE INVENTION

There are many cases in which it is desired to effect remote control of the operation of a certain number of receivers or actuators from a centralized control point. A known solution consists in associating each receiver or actuator with a terminal which receives messages from a control terminal located at the control point, the terminals deriving the actuating signals for the receivers in response to received messages.

This type of installation is experiencing particularly significant development, especially in the realm of home automation. As is known, particularly in a living place, this technique consists in allowing centralized remote control from a central control console of a certain number of receivers installed at different locations. This console can be programmed to transmit instructions automatically to different receivers at predetermined instants or it can receive a particular command from a site occupant to control the operation of the receiver remotely. As is well known, the receivers or actuators can be very varied. Remote control of light switches, turning television sets, video tape recorders, etc. on or off, turning heating on or off, turning electric cookers on or off may be cited.

The remote control is effected from a control terminal, which is connected to a plurality of controlled terminals, each terminal being connected to one of the receivers to control its operation. The controlled terminals are connected to the control terminal over a network to enable the control terminal to send instruction messages to the various controlled terminals, and enable them to send acknowledgement messages for example to the control terminal.

It will readily be understood that, in such an installation and particularly in the case of a home automation installation, it is very important to be able to modify the structure of the network connecting the controlled terminals to the control terminal, especially in order to allow the addition of new terminals associated with new receivers. Particularly in the case of home automation it is very desirable that the procedures for installing new terminals on the network shall be very simple, so that they can be implemented by the occupants of the sites in which the remote control network is installed, without the need for special knowledge. In such a network, each terminal which is to effect control or be controlled is identified by specific data which allows identification of the origin of the message during transmission and identification of the destination of the message during reception. As a result, when installing a new controlled terminal on the network, one of the operations which is necessary is to give the new terminal data specific thereto, to make this specific data known to the control terminal and to make the data specific to other controlled terminals and more particularly specific to the control terminal known to the new controlled terminal.

An object of the present invention is to provide a method and a system for transmitting messages between a control terminal and controlled terminals installed on a network, which allows installation of new controlled terminals on the network in a simple manner and which has great flexibility in implementation.

SUMMARY OF THE INVENTION

In order to meet this object, the invention provides a method of transmitting messages between a control terminal and controlled terminals interconnected by a network to allow transfer of said messages, the network being identified by data specific thereto, each controlled terminal being adapted to be installed on the network, wherein:

the messages transmitted between the terminals installed on the same network include a destination data field comprising a first sub-field for data identifying the network and a second sub-field for data specific to the destination station, and include an originator data field comprising a first sub-field for second data identifying the network and a second sub-field for data specific to the originating terminal;

an identifying data item is allocated to each controlled terminal to be installed on the network, whereby this terminal transmits an installation request message on the network including in its destination field first and second general data in the first and second sub-fields and including in its originator field the first general data and the data item specific to the originating terminal in the first and second sub-fields;

the control terminal is responsive to the installation request message to transmit a message including in the destination field the first general data and data specific to the terminal to be installed and related to the specific data item, and including in the originator field the data specific to the network and data specific to the control terminal; and on receipt of the installation message, the terminal to be installed stores the data which is specific thereto, the data specific to the control terminal and the data specific to the network, whereby the controlled terminal is installed.

It will be understood that, because of the procedure described above, the installation of a new controlled terminal is very simple, since the terminal is programmed to transmit the installation request message spontaneously, for example as soon as the user has entered the specific data item into the terminal or has connected up the latter. The sequence of operations up to the actual installation of the new controlled terminal can take place without further intervention by the network user.

The invention likewise concerns a system for implementing the message transmission method defined above.

BRIEF DESCRIPTION OF THE DRAWINGS

An embodiment of the invention is described by way of example with reference to the accompanying drawings, in which.

DETAILED DESCRIPTION

Figure 1:
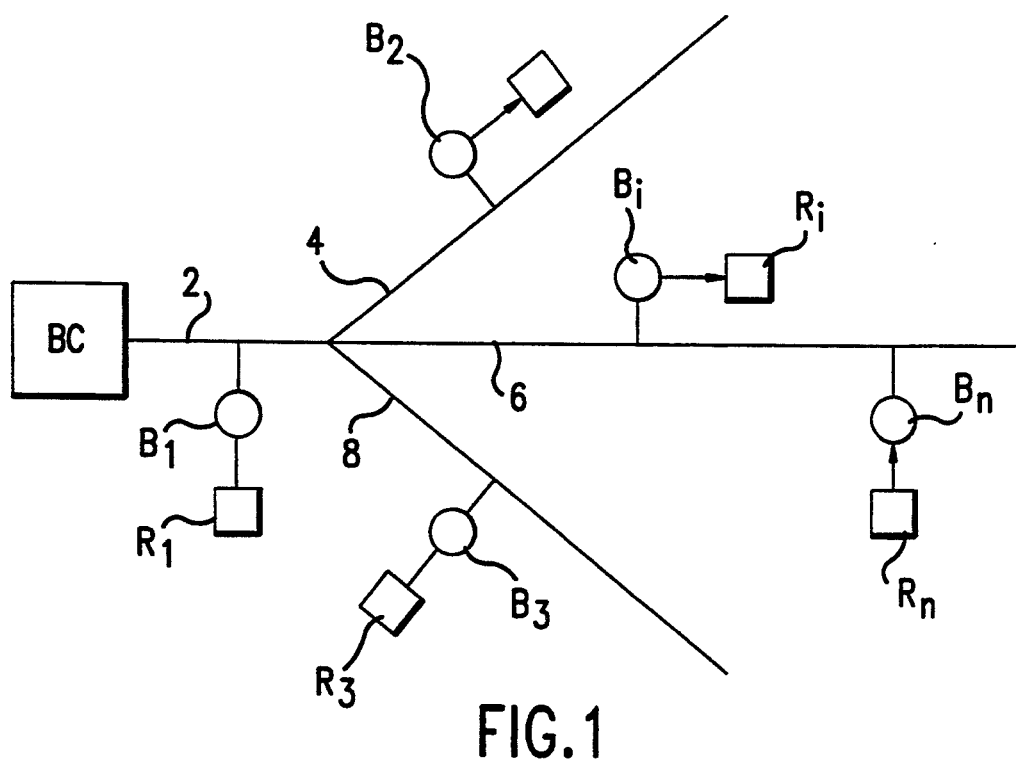
FIG. 1 shows an example of a network interconnecting a control terminal and controlled terminals.

A network system is described, initially with reference to FIG. 1. It comprises a control terminal BC and a plurality of controlled terminals B1, B2, ..., Bi ..., Bn, which are connected by a network 2, 4, 6, 8, ... to the control terminal BC. The network may be of any form and may comprise a wired information transmission network, a network transmitting information in the form of infra-red rays, in the form of radio waves, etc. Furthermore the network may be of different natures depending on the part of the network considered, in which case, of course, it includes interfaces between the different-nature parts of the network. The receivers or actuators which are controlled by the corresponding terminals are referenced R1, R2, ..., Ri, ..., Rn.

The manner of transmission of messages between the various terminals is as follows: When a terminal transmits a message, all the other terminals listen. As will be explained later, each message includes a destination address which thus allows the destination terminal actually to receive this message by comparing it with data already stored in its memory, the other terminals ignoring the message. If several terminals wish to transmit at the same time, the general system protocol handles the problem of message collision. This involves problems well known in this kind of installation. It will not be described in more detail.

Figure 3:
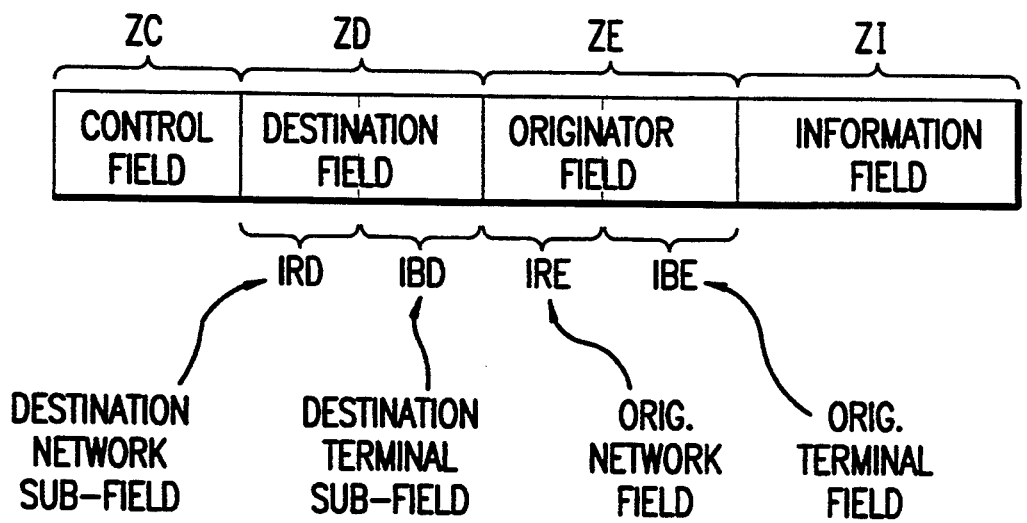
FIG. 3 shows the form of messages exchanged between the various terminals on the network.

FIG. 3 shows the common format of all messages exchanged between the various terminals of the network. The message includes a control field ZC, for example eight bits, a destination field ZD, an originator field ZE and a data field ZI. The destination field ZD is in turn divided into a sub-field for network destination data IRD and a second sub-field for destination terminal data IRB. Similarly, the originator field ZE includes two sub-fields corresponding respectively to the originator network data IRE and originator terminal data IBE.

During normal use of the network, i.e. during conversation between the installed controlled terminals, the data in the sub-fields IRD and IRE are the same and are characteristic of the network involved. This data allows two networks which are connected physically to the same control terminal BC to be distinguished. The data IBD consists of an address specific to the destination terminal for the message and the data IBE consists of data specific to the terminal originating the message. The field ZI includes the data which is to be transmitted to the terminal whose address is identified by the data IBD, combined with the network data IR.

By way of example, the two destination sub-fields may each comprise sixteen bits, the two originator sub-fields may equally comprise sixteen bits each and the data field may comprise up to thirty-two bytes.

As has already been briefly explained, the principle of the invention in relation to the installation of a new controlled terminal on the network consists in the terminal originating a message including data in the destination field ZD identifiable by all the terminals of the network, and in particular by the control terminal BC, and in the originator field ZE including a specific IRE value and a data item specific to the terminal to be installed as the value of IBE. This particular message value tells the control terminal BC that a new controlled terminal is to be installed. On reception of the this message, the control terminal BC transmits a series of messages allowing the actual installation of the controlled terminal.

Figure 2:
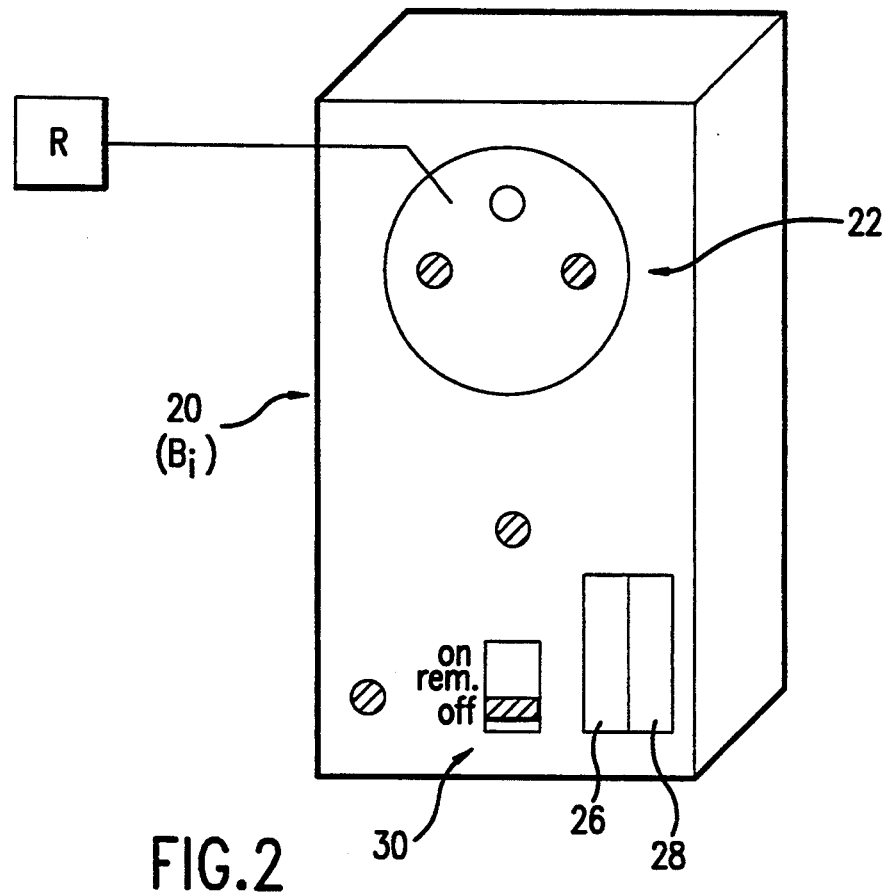
FIG. 2 shows a possible embodiment of a controlled terminal in perspective.

FIG. 2 shows an embodiment of a controlled terminal 20. This comprises an electric power outlet 22 for controlling electrically the receiver R with which it is associated. The terminal 20 comprises, for example, two alphanumeric data input devices 26 and 28. Each input device is a code ring or wheel allowing sixteen different numerical values to be set. By operating the two input devices 26 and 28 it is thus possible to enter into a memory of the terminal the particular numerical data set up in this way. The terminal 20 also comprises a control switch 30 for controlling the state of the terminal. This switch allows either local control of the receiver R associated with the terminal or remote control from the control terminal of the network on which the controlled terminal is installed. The switch 30 can assume an ON position or an OFF position in the case of local control and the intermediate REM position when it is desired to control the terminal remotely, which of course forms the subject matter of the present invention. Furthermore the terminal 20 comprises electronic circuits, not shown in FIG. 2. For an understanding of the invention it is sufficient to say that these circuits comprise an EEPROM memory such that the data stored in the memory cannot be lost even in the case of failure of the electric power supply. This memory includes a field for writing in data items, in particular as acquired during the installation of the terminal. It also includes fixed data enabling it to control the receiver R with which it is associated in dependence on the instructions received from the control terminal BC.

Figure 4:
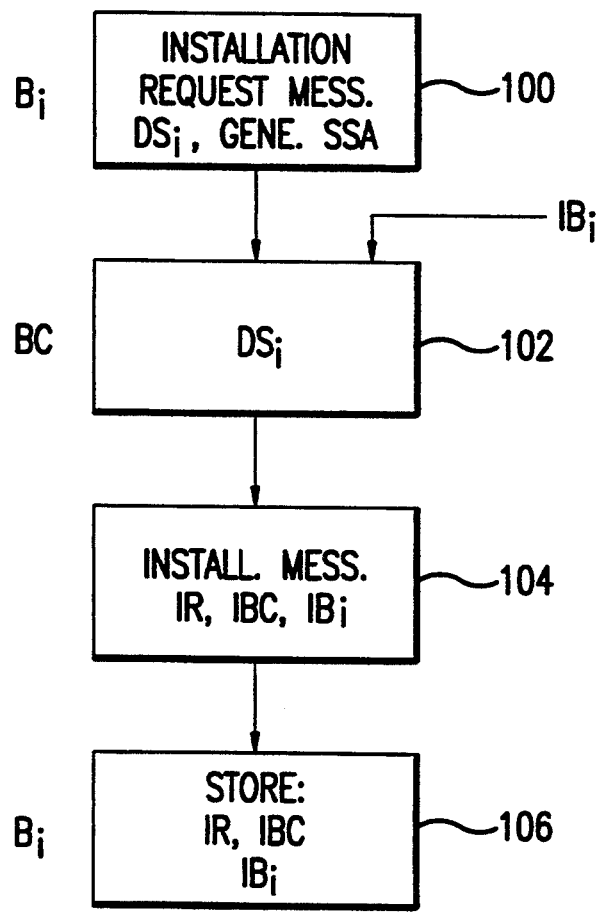
FIG. 4 is a flowchart explaining the different messages exchanged during the installation of a controlled terminal.

Referring now to FIG. 4, the network installation procedure for the terminal Bi is now be described. In a first interval the user of the network enters a data item DSi specific to the terminal, by means of the switches 26, 28. In response to the entry of this data, the terminal Bi transmits on the network an installation request message corresponding to step 100. As already indicated, the installation request message is of the form explained above. More particularly, the only characteristic data which it contains is the data item DSi in the sub-field IBE. More particularly, the terminal address data IBD assumes a specific value SSA which can be identified by all the terminals already installed and thus by the control terminal BC. SSA is destination data used by the control terminal BC in normal operation to send message to all the controlled terminals. The network data IR in each of the sub-fields IRE and IRD is set to the value GENE which is likewise identifiable by the control terminal BC. It will be understood that the GENE and SSA data are initially stored in a ROM of each controlled terminal. This is no kind of a drawback since the GENE and SSA data represent general data common to all the systems conforming to the invention, independent of the particular installation involved.

When (step 102) the control terminal BC receives the installation request message, the following operations are performed: on reception of the message the terminal BC detects the special nature of the transmitted message and determines that it relates to an installation request. It stores the specific data item DSi. At this stage, the network user has the option of replacing the specific data associated with the terminal by terminal data which will be more explicit as to the nature thereof. If this is the case, the specific data item DSi is converted into terminal data IBi which will be the address of the terminal Bi in the network. Then the terminal BC derives an installation message corresponding to the step 104. The installation message naturally has the same form as all the messages exchanged on the network. This installation message includes in the field ZD the network value GENE as the IRD data of the destination network and, in the second sub-field, the IBD data which, in this particular case is the same as the IBi data associated with the terminal to be installed. In the field ZE, the first sub-field includes the network identification data IR specific to the network as the IRE value and, as the IBE value, the value IBC corresponding to the address of the control terminal.

When the installation message is transmitted on the network by the control terminal, only the terminal Bi can form a relationship between the destination data IBi and the specific data item DSi which it had transmitted initially. As a result, only the terminal Bi receives the installation message. In order to correctly identify the IBi message from the control terminal, the terminal Bi may be preprogrammed to identify and translate messages in the format IBi to recognize that the data IBi is derived from the data item DSi. Alternatively, the installation message from the control terminal can include both IBi and DSi in the field IBD, this is step 106 in FIG. 4.

On reception of the installation message, the terminal Bi stores in its EEPROM memory: the network data IR; the data specific to the control terminal IBC; and its specific data IBi, which replaces the initial data item DSi. Once the terminal Bi has stored its own specific data IBi, i.e. its address on the network, the network data IR, and the specific data, i.e. the address IBC of the control terminal, then the terminal Bi is installed. Thus, on each transmission of a message by the control terminal or by any other, controlled terminal, it is possible for the newly-installed controlled terminal to determine if the message is destined to itself since it knows the network data IR and it can compare the portion of the data in the sub-field IBD with its own address IBi and it can in turn send a message to the control terminal, for example an acknowledgment, on the basis of its own specific data and the network data and the data specific to the control terminal.

The terminal Bi to be installed transmits a first installation request message when the specific data item DSi is entered. It re-transmits this same message every 15 seconds so long as it has not received the installation message in reply. If at the end of 5 minutes the terminal Bi has not received the installation message from the control terminal, it stops transmitting.

The controlled terminal Bi stays installed as long as the user does not alter the specific data item DSi of this terminal by actuating the switches 26 and 28. If the user does do this, then the terminal Bi will send a network installation request message again, as described above.

In the preceding description of the operation of the network, the terminals Bi are controlled individually by the control terminal BC by means of messages sent separately to each of the controlled terminals. It is however possible to effect simultaneous control of several terminals by means of the same instruction. To do this the list of the addresses of the various terminals Bi which are to be controlled simultaneously at least for certain types of operation is entered in the control terminal. The corresponding messages include the list of the various terminals concerned in the data field ZI. To do this, each terminal Bi of a group stores in EEPROM memory the list of addresses IBj of the other terminals of the group. Once the addresses of the various terminals of the same group have been stored in the memories of the terminals involved, a message including the address of one of the terminals of the group will be received, by a comparison, by all the terminals of the group and will be executed by them.

We claim:

1. A method of transmitting messages between a control terminal and controlled terminals interconnected by a network to allow transfer of said messages, the network being identified by data specific thereto, each controlled terminal being adapted to be installed on said network, wherein:

the messages transmitted between a control terminal and controlled terminals installed on the same network include a destination data field comprising a first sub-field for data identifying the destination network and a second sub-field for data specific to the destination station, and include an originator data field comprising a first sub-field for second data identifying the network and a second sub-field for data specific to the originating terminal an identifying data item is allocated to each controlled terminal to be installed on the network, whereby this terminal transmits an installation request message on the network including in its destination field first and second general data in said first and second sub-fields and including in its originator field said first general data and said data item specific to the originating terminal in said first and second sub-fields;

said control terminal is responsive to said installation request message to transmit a message including in said destination field said first general data and data specific to the terminal to be installed and related to said specific data item, and including in said originator field said data specific to the network and data specific to the control terminal; and on receipt of said installation message, said terminal to be installed stores said data which is specific thereto, said data specific to the control terminal and said data specific to the network, whereby said controlled terminal is installed.

2. A method according to claim 1, wherein said controlled terminal to be installed transmits said installation request message repeatedly at predetermined intervals during its installation, until it receives the installation message or until expiration of a predetermined interval of time.

3. A method according to claim 1, wherein the controlled terminals are provided with a memory to store data and wherein the data stored in each installed controlled terminal stays in the memory of said terminal until a new specific data item is entered in said terminal.

4. A method according to claim 1, wherein said first general data is known initially to all the controlled terminals and to the control terminal.

5. A system for transmitting messages between a control terminal and controlled terminals interconnected by a network to allow transfer of said messages, each controlled terminal being adapted to be installed on said network, wherein:

each controlled terminal comprises means for storing a data item specific to said terminal;

each terminal comprises means for transmitting messages comprising a destination data field including a first sub-field for destination network identification data and a second sub-field for data specific to the destination station, and an originator data field including a first sub-field for said originating network identification data and a second sub-field for data specific to the originating terminal; and said terminal comprises means for transmitting an installation request message on the network in response to a request to initiate its installation on the network, this installation request message including in the destination field first and second general data in said first and second sub-fields and including in the originator field said first general data and said specific data item of the originating terminal in said first and second sub-fields;

said control terminal comprising means responsive to said installation request message to transmit a message including in said destination field said network identification data and data specific to the terminal to be installed and related to said specific data item, and including in said originator field said data specific to the network and said data specific to the control terminal; and said controlled terminal comprising means responsive to said installation message to store said data which is specific thereto, said data specific to the control terminal and said data specific to the network, whereby said controlled terminal is installed.

6. A system according to claim 5, wherein said means for storing a specific data item in the controlled terminal comprise at least one code wheel.

* * * * *